United States Patent [19]

Chang et al.

[11] 3,911,464

[45] Oct. 7, 1975

[54] NONVOLATILE SEMICONDUCTOR MEMORY

[75] Inventors: Wen Hsing Chang, Essex Junction; Hsing-San Lee, Williston, both of Vt.

[73] Assignee: International Business Machines Corporation, Armonk, N.Y.

[22] Filed: May 29, 1973

[21] Appl. No.: 364,584

[52] U.S. Cl. ............ 357/23; 307/238; 340/173 CA; 357/14; 357/24; 357/45; 357/54

[51] Int. Cl.[2] ........................................ H01L 29/78

[58] Field of Search ................ 317/235 AZ, 235 G; 307/238; 357/23, 24, 43, 45, 54, 14; 340/173 R, 173 CA

[56] References Cited

UNITED STATES PATENTS

| | | | |
|---|---|---|---|
| 3,591,852 | 7/1971 | Chen | 307/225 |
| 3,702,990 | 11/1972 | Ross | 340/173 R |
| 3,713,111 | 1/1973 | Ross | 340/173 R |
| 3,719,866 | 3/1973 | Naber et al. | 317/235 R |
| 3,755,793 | 8/1973 | Ho et al. | 357/24 |
| 3,810,125 | 5/1974 | Stein | 307/238 |
| 3,816,769 | 6/1974 | Crowle | 307/304 |
| 3,838,405 | 9/1974 | Arnett et al. | 307/238 |
| 3,859,642 | 1/1975 | Mar | 340/173 CA |

OTHER PUBLICATIONS

L. Terman, "Al-Si Self Aligned Gate 1-Dev, Cell W. Narrow Word Line Pitch," I.B.M. Tech. Discl, Bull, Vol. 15 No. 4, Sept. 1972, pp. 1163-1164.

I. Ho et al., "Single-Electrode One-Device Cell," I.B.M. Tech. Discl. Bull., Vol. 15 No. 6, Nov. 1972, pp. 1765-1766.

H. Dill et al., "A New Mivos Charge Storage Effect," Solid-State Electronics, Vol. 12, 1969, pp. 981-987.

*Primary Examiner*—Andrew J. James
*Assistant Examiner*—Joseph E. Clawson, Jr.
*Attorney, Agent, or Firm*—Howard J. Walter, Jr.

[57] ABSTRACT

A nonvolatile random access memory array comprising variable threshold insulated gate field effect transistor devices is described. Each memory element is comprised of a variable threshold field effect gate region located adjacent to a single sensing diffusion which is used to sense change in electrical potential of the sensing diffusion as the effective capacitance of the diffusion is coupled into a depletion region under the gate electrode during a READ cycle. Information is written into the memory by selectively applying a field in excess of a critical magnitude across the variable threshold dielectric to cause the device to assume a high or low threshold state. To read information out of the memory, an inversion region extending from the sensing diffusion under the gate region is used to effectively switch, or reconfigure, the equivalent electrical circuit of the device to alter the capacitive loading presented by the device to the sensing diffusion depending upon whether the device is in a high or low threshold condition. Various gate structures for improving the sensitivity of the memory are disclosed along with a single or multiple pulse sensing scheme which increases sensed voltage and reduces fatigue problems usually associated with conventional variable threshold semiconductor devices.

12 Claims, 16 Drawing Figures

NONVOLATILE SEMICONDUCTOR MEMORY

BACKGROUND OF THE INVENTION

1. Field of the Invention

This invention relates to semiconductor memory devices and more particularly to nonvolatile field effect memories having variable threshold characteristics.

2. Description of the Prior Art

Nonvolatile variable threshold semiconductor memory devices have been previously described which rely on the ability to electrically alter the conduction threshold of the surface of a semiconductor body such that a high and low threshold condition can represent binary information. Although various materials including ferroelectric bodies have the desired properties for such a function, much attention has recently been given to the MXOS (Metal-Charge trapping layer-Oxide-Semiconductor) field effect transistor. Memory arrays have been previously described which utilize single MXOS devices as storage cells. Each element is normally comprised of a variable threshold insulated gate FET whose conduction threshold is electrically alterable by impressing a binary polarity between the gate electrode and the substrate in excess of a predetermined critical magnitude. The polarity of the voltage determines the sense in which the threshold is varied. Upon the application to the gate electrode of a fixed interrogation, or read, voltage having a value intermediate the binary values of the conduction thresholds, the binary condition of the transistor can be sensed by monitoring the resulting source-drain current.

One of the problems faced by manufacturers of semiconductor memory products is that of relative cost per bit of stored information. Initial integrated circuit semiconductor memory designs utilized bipolar transistors and required a plurality of devices to form a single stable storage cell. Memory circuits employing the MXOS gate structure allow the use of a single transistor to act as a storage cell and provide an increase in density which decreases the cost per bit in the overall memory system. Further increases in density have been limited in the past by device geometries as opposed to the number of devices per unit cell. Although the prior art MXOS devices have reduced the size of storage cells, various additional problems have been introduced because of: the high fields necessary in order to write information into storage cells, undesirable variations in threshold voltages, and the requirements in some systems for additional power supplies. In addition, conventional MXOS devices require separate source and drain electrodes having a potential impressed between them giving rise to leakage currents which, if excessive, can destroy the effect of large portions of a memory array. Because current sensing is used in prior art devices, degradation of transconductance also poses a problem.

SUMMARY OF THE INVENTION

The instant invention provides an integrated circuit memory array utilizing storage devices each having only a single diffusion adjacent to a variable threshold gate region. As in conventional MXOS transistor devices binary storage of information is achieved by selectively preconditioning the threshold of the MXOS gate region by writing in a manner similar to known variable threshold memories. Readout is achieved by presetting the single diffusion to a known potential thereafter applying to the gate a read voltage intermediate the high and low threshold values while sensing the change in the floating potential of the diffusion. Capacitive switching in the semiconductor surface allows the effective capacitance of the floating diffusion to vary when a gate region is in the low threshold state and inversion of the semiconductor surface occurs. By varying the potential profile under the gate region repetitive removal of carriers from the floating diffusion provides a larger sense signal and allows lower stresses to be utilized across the gate region during erase and write cycles.

It is therefore the primary object of this invention to provide a variable threshold semiconductor memory having increased packing density over single transistor memory arrays of the prior art.

It is another object to provide a variable threshold memory device which reduces the fatigue problem encountered in prior art variable threshold devices.

It is still a further object to reduce leakage problems associated with conventional MXOS devices.

The foregoing and other objects, features, and advantages of the invention will be apparent from the following more particular description of the preferred embodiments of the invention, as illustrated in the accompanying drawings.

DESCRIPTION OF THE PREFERRED EMBODIMENTS

Figure 1:
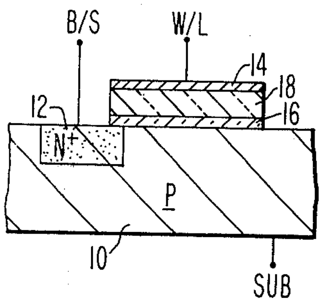
FIG. 1 is a schematic, vertical, sectional view of an embodiment of the invention showing the physical relationship between the sensing diffusion and the variable threshold gate region.

Referring now to FIG. 1 there is shown a first embodiment of the memory device of the invention. Semiconductor substrate 10 of a first conductivity type, for example, 2 ohm-cm.p-type semiconductor material, is provided with a single diffusion 12 of opposite conductivity type material forming a PN junction having a depth of about 1 micron. Diffusion 12 is connected to a bit sense line B/S to enable selective addressing and sensing of the memory device. Positioned in field applying relation to the surface of semiconductor substrate 10 is a conductive gate electrode 14. Required operating potentials are applied to gate 14 through word line W/L. Intermediate gate 14 and the surface of substrate 10 is a composite variable threshold storage material comprising, for example, a first layer of silicon dioxide 16 having a thickness of about 30 Angstrom units and a silicon nitride layer 18 having a thickness of about 500 Angstrom units. Ohmicly connected to substrate 10 is a conductor SUB for applying potentials to the substrate.

The application of a potential field of a first polarity in excess of a critical value across the MNOS gate structure will cause available carriers at the semiconductor surface to be trapped at the interface between layers 16 and 18. A field of opposite polarity will cause carriers to be removed from the interface. The theory of the MNOS structure is well known by those skilled in the art and is discussed in various prior art references.

The writing of information is accomplished in a manner similar to that used in conventional MXOS devices and will be described in more detail in connection with FIGS. 5 and 6. In the following discussion of FIGS. 2 and 3 it will be assumed that the variable threshold condition has previously been set to a predetermined low threshold value representative of a logical condition.

Figure 2A:
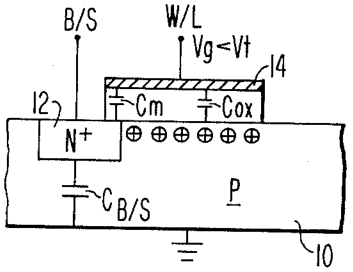
FIG. 2A is a schematic, vertical, sectional view of the device in FIG. 1 shown in a condition in which the semiconductor surface under the gate region is accumulated.
Figure 2B:
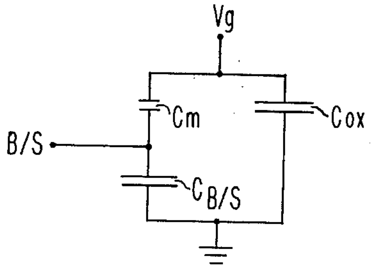
FIG. 2B is an equivalent schematic circuit of the device in FIG. 2A.

There is shown in FIG. 2A the device of FIG. 1 under the following biasing conditions: substrate contact SUB is set at ground potential, a gate voltage V*g* is applied to gate 14 which is less than the potential necessary to cause depletion of the semiconductor surface under the gate region. Diffusion 12 is electrically floating, that is, bit/sense line B/S is not connected to a source of potential. The equivalent circuit for the device under the above conditions is shown in FIG. 2B. As can be seen the floating diffusion 12 is capacitively coupled to the gate electrode through the Miller capacitance Cm and to ground through the bit/sense line capacitance $C_{B/S}$. Gate voltage V*g* is directly coupled to ground potential through the relatively large capacitance C*ox* formed between the gate 14 and the accumulated upper surface of substrate 10. The Miller capacitance is preferably very small when compared with C*ox* and the application of V*g*, provided V*g* is less than the threshold voltage V*t*, will not disturb the floating potential on the B/S line.

Figure 3A:
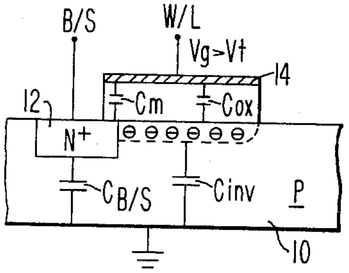
FIG. 3A is a schematic, vertical, sectional view of the device of FIG. 1 under the condition in which the surface under the gate region is in inversion.
Figure 3B:
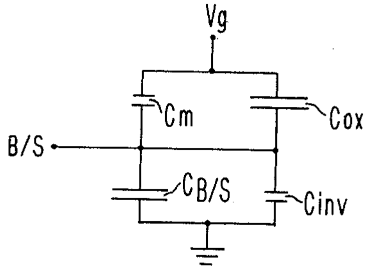
FIG. 3B is an equivalent schematic circuit of the device in FIG. 3A.

Referring now to FIGS. 3A and 3B there is shown the corresponding schematic and equivalent circuit of the device in FIG. 1 when the applied gate potential is in excess of the threshold voltage. This condition causes the semiconductor surface adjacent the gate region to invert allowing minority carriers from the diffusion, electrons in this particular example, to flow under the region covered by the gate causing a substantial change in the equivalent circuit as shown in FIG. 3B. The inversion region has associated with it the capacitance C*inv* which now appears in series with C*ox*. Additionally, an electrical contact has been extended between the diffusion and the lower plate of the dielectric capacitance C*ox* which effectively connects the two relatively large capacitances C*ox* and $C_{B/S}$ in series between the gate voltage and ground potential allowing a significantly large potential to be coupled to the floating line B/S. This coupling causes the B/S line to assume a new potential determined by the ratios of the large series connected capacitors C*ox* and $C_{B/S}$. Since the Miller capacitance and the inversion region capacitance are substantially small they can be neglected for most situations.

In summary it can be seen that if the gate voltage applied to the structure of FIG. 1 exceeds the threshold voltage a substantial capacitive coupling is achieved to the floating bit sense line which raises or lowers its potential depending upon the initial biasing condition. Under the condition in which the gate voltage does not exceed the threshold voltage no substantial change in the floating potential of the B/S line is produced. These two conditions are used to determine the logical condition of the variable threshold memory device.

Figure 4:
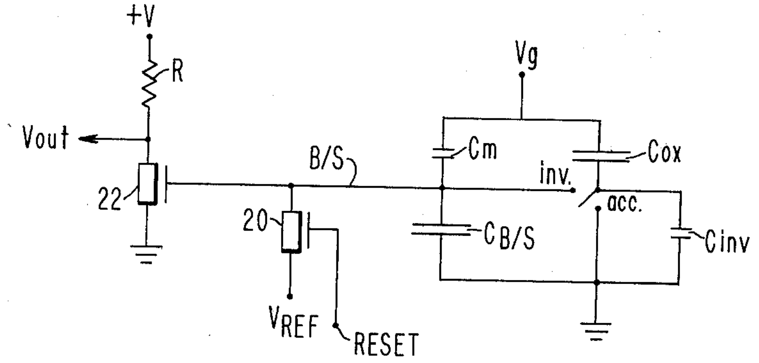
FIG. 4 is a schematic equivalent circuit of the device of FIG. 1 showing a typical sensing circuit and the relationship of the switching action of the capacitive ratios caused by the presence or absence of an inversion layer.

Referring now to FIG. 4 there is shown a schematic representation of a composite of the circuits shown in FIGS. 2B and 3B illustrating the capacitive switching function that occurs depending upon the presence or absence of an inversion layer which is controlled by the threshold condition of the gate dielectric. There is also provided a means to reset the potential of the bit sense line comprising an FET 20 having its gate connected to a reset clock pulse generator, one of its current conducting electrodes of FET 20 is connected to a reference voltage V*ref* and the other current conducting conductive electrode is connected directly to the bit/-sense line B/S. Also connected to the bit/sense line is a sensing field effect transistor 22 having its gate connected to the bit/sense line and its current conducting electrodes connected, respectively to a source of potential +V through a load resistor R and to ground potential.

Assuming that the memory cell is to be interrogated, during a first time period a reference potential of, for example, zero volts is applied through FET 20 to B/S line while V*g* is maintained at a value below the low threshold potential for the particular memory device, for example at zero volts. During a second time period FET 20 is turned off leaving B/S line floating but still maintaining the applied preset potential due to the lack of a discharge path. Gate voltage V*g* is then raised to a value intermediate the previously determined high and low threshold potentials in order to cause the semiconductor material under the gate region to go into accumulation or inversion depending upon the threshold state of the memory element. If the memory device has been set in a high threshold state the semiconductor surface will not invert but will be in accumulation when the read gate voltage has been applied, causing the equivalent circuit to effectively close the switch connecting the lower plate of the C*ox* capacitor directly to ground potential. The only influence that the read voltge will have on the floating B/S line and subsequently the sensing FET 22 will see a very minor coupling achieved through the very small Miller capacitance $Cm$. If on the other hand the memory device is in a low threshold condition an inversion layer will form under the gate region effectively closing the equivalent circuit switch between the lower plate of $Cox$ and the upper plate of $C_{B/S}$ effectively placing the large capacitors $Cox$ and $C_{B/S}$ in series between $Vg$ and ground. This causes a significant change in the effective capacitance of the B/S line which in turn results in an increase in voltage at the voltage sensing FET 22 causing FET 22 to turn on and causing $V_{out}$ to drop from its normal value of +V to a potential near ground.

Figure 5:
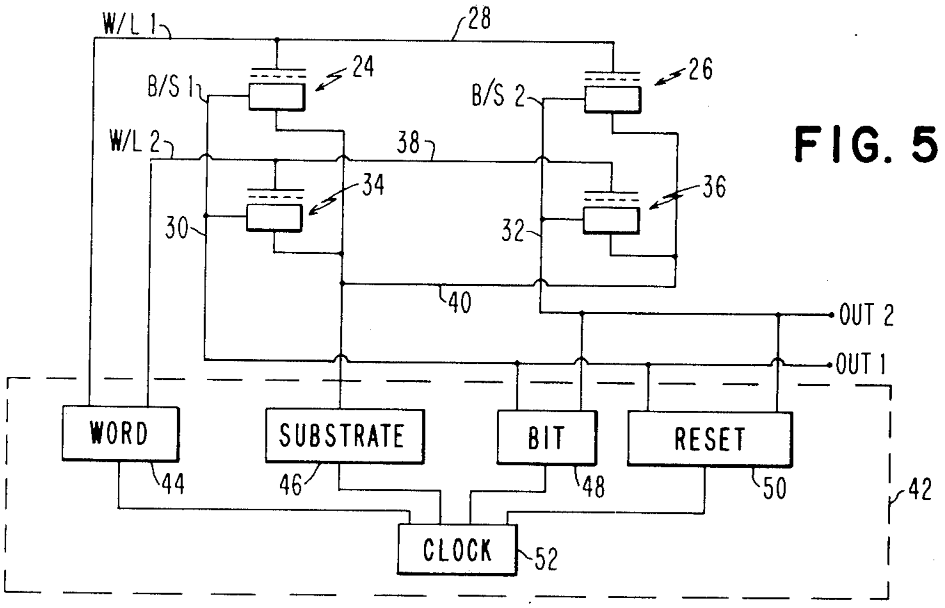
FIG. 5 is a schematic circuit of a memory array utilizing devices of FIG. 1 and showing the system controls necessary to operate the circuit as a random access memory.

Referring now to FIG. 5 there is shown an electrical schematic of a typical memory array comprising a plurality of variable threshold memory device having the structure of the device in FIG. 1. Memory devices 24 and 26 comprise two bit positions of a first word and have their gate electrodes connected in common to a first word line 28. The single diffusions of each memory device 24 and 26 are respectively coupled to a first and second bit sense line 30 and 32. Memory elements 34 and 36 correspond to a two bit second word and have their gates connected in common to a second word line 38. Devices 34 and 36 also have their respective sensing diffusions connected to the first and second bit sense line 30 and 32. The substrates of all of the memory elements are connected to a common substrate line 40.

Voltages to be applied to the memory array are provided by a logic means 42. Voltages applied to word lines WL1 and WL2 are supplied by word source 44. Substrate, bit line and reset voltages are applied by the respective sources 46, 48, and 50. A clock source 52 provides proper timing of the respective voltages in order to provide the desired memory function.

Figure 6:
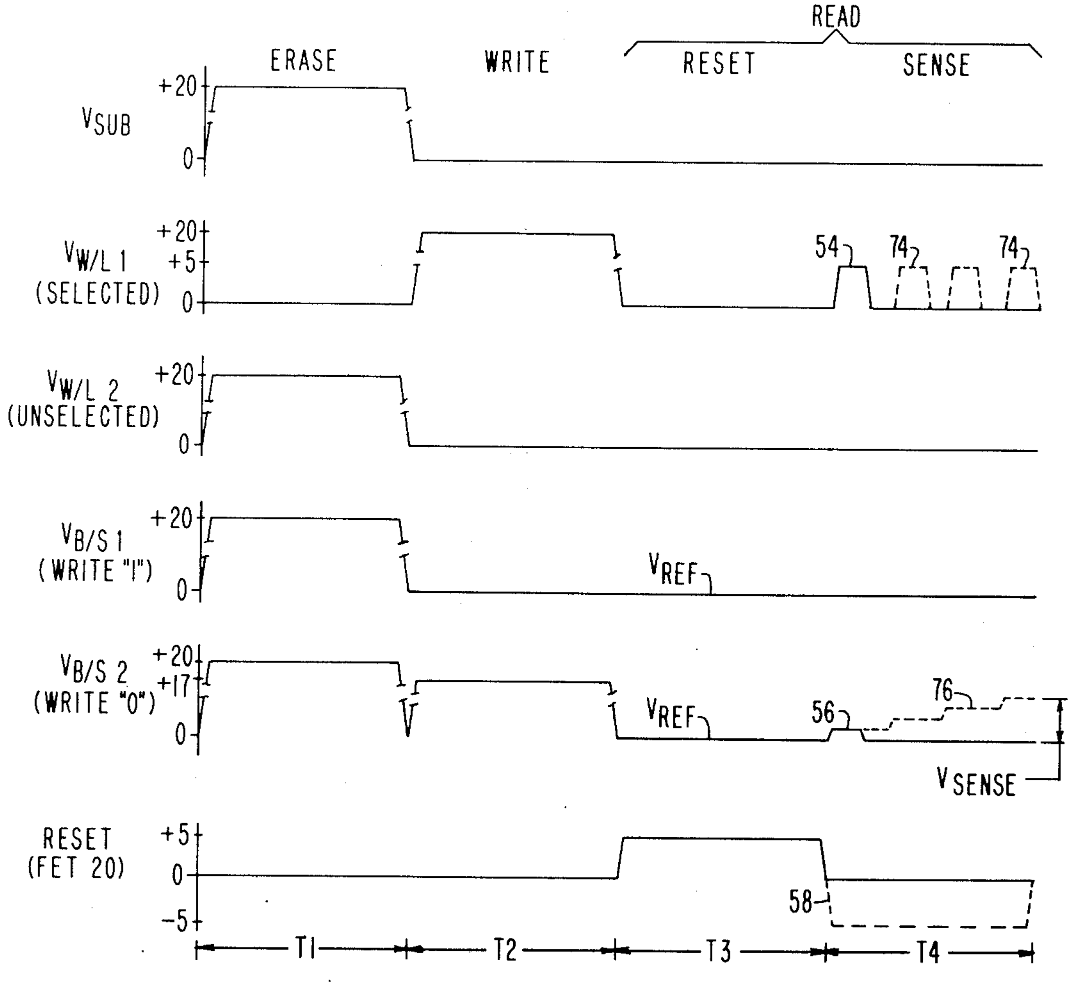
FIG. 6 is a pulse program illustrating the waveforms of the various potentials applied by the control circuits of the memory in FIG. 5.

Voltages applied to the memory elements during the various memory cycles are applied as indicated in FIG. 6.

In order to insure that the high and low threshold states remain relatively close to their originally set values it is preferable to precede each WRITE operation with an ERASE cycle. Assuming it is desired to change the memory contents of word 1, a negative potential field from gate to substrate is applied to memory devices 24 and 26 by applying 20 volts to the common substrate line 40 while applying zero volts to WL1. In addition, 20 volts is also applied to both the bit sense lines B/S1 and B/S2 to insure that the full 20 volt field is applied across the variable threshold dielectric of the devices in word 1. In order to insure that the threshold values in word 2 are not disturbed, 20 volts is applied to the word line WL2. Assuming that it is desired to change the threshold state of device 24 from its initial, or erased, low threshold state to a high threshold state representing a binary 1, and to maintain the low threshold state for device 26 representing a binary code 0, a positive potential in excess of the critical value necessary to change the threshold is applied from gate to substrate across device 24, as shown, by applying 20 volts to word line WL1 while maintaining bit sense line BS1 at a zero volt level. In order to prevent the threshold from changing in device 26 its bit sense line B/S2 is placed at a potential of approximately 17 volts in order to insure that the major portion of the 20 volts applied between gate and substrate of device 26 appears across the substrate and not the variable threshold dielectric material. Memory devices 34 and 36 of the unselected word 2 will not have their threshold voltages disturbed because of the application of zero volts to their gate electrodes through word line WL2.

Information is read out the memory array during a READ cycle. The READ cycle contains two portions and are indicated in FIG. 6 as occurring at time periods T3 and T4. As previously discussed, the actual sensing of information in the memory devices is preceded by a RESET cycle in which the bit sense lines are reset to a reference potential $Vref$ and thereafter left in a electrically floating condition. During time period T4 a READ pulse 54 is applied to the selected word line WL1 which has a magnitude intermediate the high and low threshold states, for example, 5 volts. Because device 24 is in a high threshold condition the surface under the gate electrode will be in accumulation and the potential on bit sense line B/S1 will remain at the reference potential during T4. However because device 26 is in its low threshold state an output pulse 56 will appear on the bit sense line BS2 indicating that device 26 is storing a binary 0. In order to avoid voltage changes due to subthreshold leakage current through reset FET 20 it may be desirable to apply a negative gate voltage to this device during sense time T4 as shown by the dotted portion 58 of the reset waveform. The additional dotted waveforms indicated during time period T4 will be discussed in connection with FIGS. 9 through 11.

Figure 7:
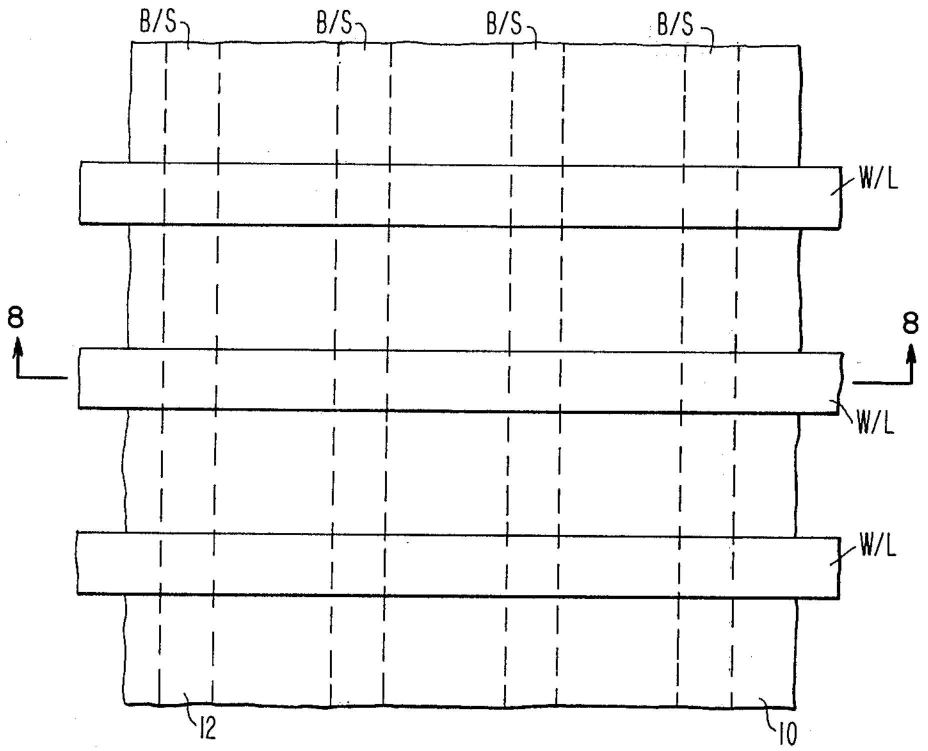
FIG. 7 is a schematic representation of a plan view of a portion of a typical memory array of the invention showing the orthogonal relationship between the bit sense diffusions and the word lines.
Figure 8:
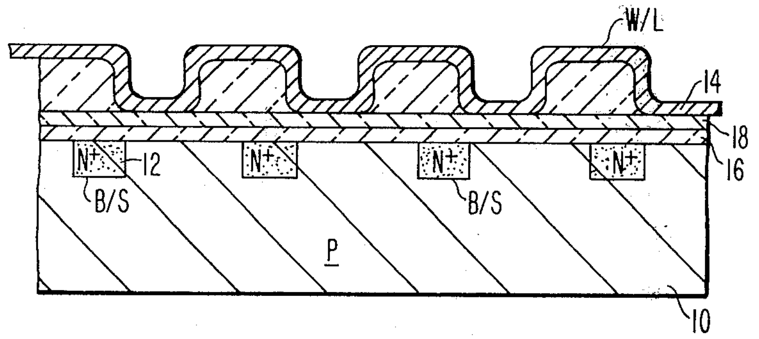
FIG. 8 is a sectional view of the memory array of FIG. 7 taken along the lines of 7—7 and shows the vertical profile of the memory devices.

Referring now to FIGS. 7 and 8 there are shown schematic representations of a plan and vertical profile of a typical array portion of a semiconductor slice containing a plurality of variable threshold memory elements. As can be seen in FIG. 7 each memory element is formed at the intersection of a diffused bit sense line B/S and an orthogonal metal word line W/L. Except for the formation of electrical contacts to the bit sense line diffusions 12 and substrate 10 no additional diffusions, metallurgy or contacts are required in the array area. FIG. 8 shows the vertical structure of the memory devices and is a repetition of identical elements as previously described in connection with FIG. 1.

Figure 9:
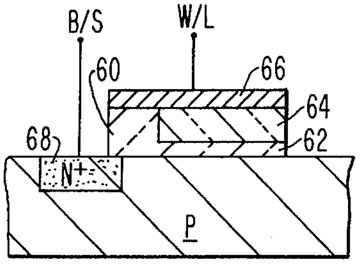
FIGS. 9 and 10 are schematic sectional views of additional embodiments of the instant invention showing variations in the structure of the gate region.
Figure 10:
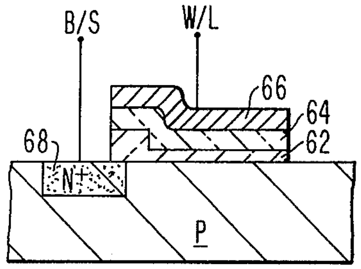

Referring now to FIGS. 9 and 10 there is shown two variations in the gate structure of the variable threshold memory element of the invention which may be utilized to enhance the magnitude of the capacitively switched voltage appearing on the bit sense lines. Unlike the device of FIG. 1, the gate structure of the device in FIG. 9 is provided with a nontunneling or fixed threshold portion 60 comprising a thickness of tunneling dielectric sufficiently great to insure that tunneling will not occur and that the threshold essentially will be fixed by the thickness of region 60. Adjacent to the fixed threshold region of the gate area is a variable threshold region having essentially the same structure as that described in connection with FIG. 1 and consisting of a tunneling dielectric layer 62, preferably silicon dioxide and a trapping layer dielectric 64 preferably comprising silicon nitride. A conductive gate member 66 overlies the gate region and a small portion of bit sense line diffusion 68. By providing a nontunneling dielectric gate region adjacent to the diffused bit sense line, the low threshold level of the device may be fixed at a value in excess of the variable low threshold provided by the dielectric layers 62 and 64. This will enable the variable low threshold condition to be set at a much lower value than in conventional MXOS devices allowing the use of much lower critical potentials during ERASE cycles. The fixed low threshold voltage also eliminates read retention problems associated with conventional MXOS devices. When a potential is applied to gate electrode 66 the field induced in the semiconductor substrate will be of greater magnitude under the variable threshold portion of the gate region than under the fixed threshold portion. This condition is utilized to enhance the sensing potential as will be described in connection with FIG. 11. Since the trapped charges at the interface between layer 62 and 64 are spaced from the surface of the N+P junction, junction breakdown voltage becomes independent of the threshold state of the variable threshold region, a problem present when devices are in the high threshold state in conventional MXOS devices.

Referring now to FIG. 10 there is shown a second alternative embodiment of the device of FIG. 9 which utilizes a stepped dielectric layer which in some instances may be easier to fabricate than the structure of FIG. 9 because the silicon nitride layer 64 may be applied with uniform thickness over the entire array area.

Figure 11A:
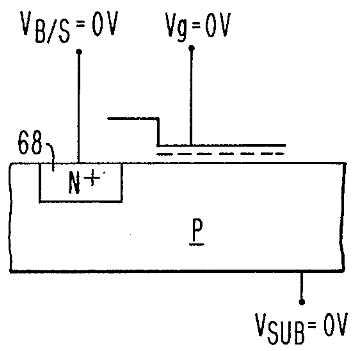
FIGS. 11A through 11D are schematic sectional views of the devices of FIGS. 9 or 10 and show the potential profiles formed in the semiconductor surface during different portions of a sensing operation.
Figure 11B:
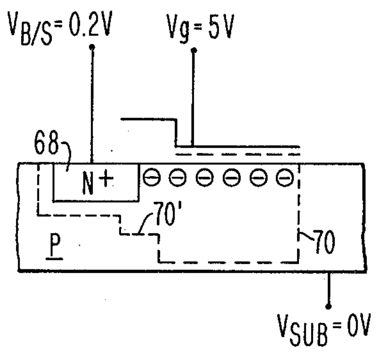
Figure 11C:
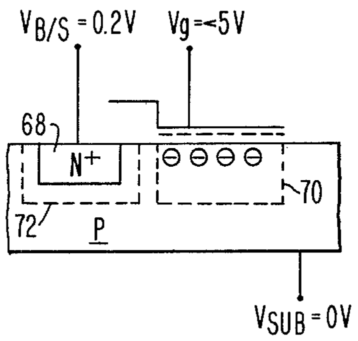
Figure 11D:
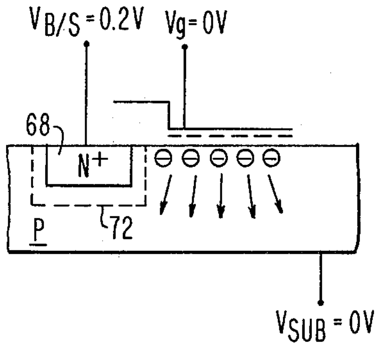

In order to explain the operation of the devices in FIGS. 9 and 10 reference will be made to FIG. 11A–D. Referring now to FIG. 11A there is shown the initial electrical conditons in the device structures of FIGS. 9 and 10 which are as follows: The device has previously been set in a low threshold state and the bit sense diffusion 68 has been reset to a reference voltage of zero volts, the gate and substrate voltages are also at zero volts. Upon the application of a voltage in excess of the low fixed threshold, for example, 5 volts, to the gate electrode, a potential profile 70 will be produced in the semiconductor body causing the removal of charge, in this case electrons, from the floating diffusion to cause the bit sense diffusion 68 to rise in potential to, for example, 0.2 volts due to the difference in the capacitive ratio of the dielectric capacitance to that of the bit sense line capacitance. It will be noted that because of the nonuniformity in the gate dielectric region a small portion 70' of the potential region 70 under the gate electrode will have a lower magnitude than that portion under the variable threshold area of the gate as shown in FIG. 11B. As the potential V*g* on the gate region begins to fall at the end of the sense pulse, the potential well under the gate region begins to collapse with the portion 70' interrupting a portion of the inversion region between bit sense diffusion 68 and the variable threshold portion of the gate region isolating a quantity of charge at a position on the semiconductor surface located in spaced relation to the bit sense diffusion which retains an isolated back bias potential of 0.2 volts and is surrounded by a depletion region 72 as shown in FIG. 11C. Referring now to FIG. 11D it will be seen that as the gate voltage reaches zero volts, the entire potential well 70 will have collapsed. Since a small portion of the channel has been previously cut off from bit sense diffusion 68, as described in connection with FIG. 11C, substantially all of the charge removed from the bit sense diffusion will be dissipated into the semiconductor substrate. By repeatedly applying a plurality of READ voltages to the gate of a selected device, as shown by pulses 74 in FIG. 6, in connection with selected word line WL1, additional charge may be removed from the floating bit sense diffusion raising its back bias potential even higher, as shown by the dotted increasing waveform 76 in FIG. 6 in connection with bit sense line BS2, to provide a sense voltage $V_{SENSE}$ substantially greater than that achievable from a single read pulse. It will be realized by those skilled in the art that the maximum potential which can be provided on the bit sense line will be limited to approximately the read gate voltage V*g* minus the threshold voltage determined by the back bias of the sense diffusion of the device.

It will also be recognized that various additional gate structures may be utilized in order to provide the proper potential field for dissipating charge from the floating bit sense diffusion, for example, diffusion or ion implantation of a small region of semiconductor impurity intermediate the fixed threshold and variable threshold portions of the gate region may also be used.

Although the composite gate region is the preferred structure for use with the pulsed reading technique, the structure of FIG. 1 may also be operted in a pulsed mode. As the field producing the inversion region in the device of FIG. 1 collapses some carriers are trapped at the semiconductor surface and recombine in the substrate. This has the effect of producing a change in the floating potential of the bit/sense line diffusion. If a plurality of pulses are applied during a single read cycle the floating potential will rise in a similar manner to that described in reference to waveform 76 of FIG. 6. This phenomenon is one of the reasons it is preferred to reset the floating potential to a low value prior to each sense cycle.

Although the invention has been described specifically in connection with a dielectric structure comprising silicon dioxide and silicon nitride, it will be understood by those skilled in the art that the materials themselves are not critical and that any semiconductor device structure which exhibits variable threshold conditions may be utilized to provide the required capacitive switching as previously described in connection with FIGS. 1 through 4. For example, it is not essential that the charges providing the variable threshold condition be transported to and from the semiconductor substrate but they may also be provided by the gate electrode as in a conventional FAMOS device, or may be provided externally such as by utilizing an electron beam or ion implantation.

It is important to note however that particularly in an integrated circuit memory environment the bit sense diffusion should be initially reset to a reference potential which is equal to that of the substrate or which provides a small back bias on the N+P junction. In addition it is important that the bit sense diffusion be floating rather than connected to some potential source as the capacitive affects will not be as apparent if the N+P junction acts as a variable diode rather than a variable capacitor in view of the fact that the changes in diode characteristics created by the extremely small relative increase in diode area caused by a single gate region will be insignificant when compared with the relative large change in capacitance achieved by the same effective extension of the diffusion caused by the inversion layer.

It should also be understood that although the invention has been described in connection with a word associated memory, bit associated memories may also be used in which single bit rather than a full word is addressed during a READ cycle.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A variable threshold memory device comprising a semiconductor substrate for one conductivity type, said substrate containing in a first portion thereof only a single region of opposite conductivity type extending from one surface thereof into said substrate;

gate electrode means disposed in field applying reation to a second portion of said substrate adjacent to said first portion of said substrate;

variable threshold means disposed between at least a first portion of said gate electrode means and at least a part of said second portion of said substrate;

means for establishing a first polarized potential across said variable threshold means causing said variable threshold means to assume a low threshold state corresponding to a first logic state and for establishing a second oppositely polarized potential across said variable threshold means causing said variable threshold means to assume a high threshold state corresponding to a second logic state;

means for selectively establishing an electrically floating reference potential on said single region of opposite conductivity type;

read means for applying at least one read potential pulse across said gate electrode means and said substrate, said pulse establishing a surface inversion layer in said second portion of said substrate connected with said region of opposite conductivity type only when said variable threshold means is in a low threshold state, the maximum potential of said read potential pulse being of less magnitude than the potential required to establish a surface inversion layer in said substrate when said variable threshold means is in a high threshold state; and sensing means for sensing capacitively coupled changes in the floating potential of said single region of opposite conductivity type, a change in said potential being sensed only when said inversion layer has been established.

2. The memory device of claim 1 wherein said substrate is silicon and said variable threshold means comprises a first and second layer of dielectric material.

3. The memory device of claim 2 wherein said first dielectric layer is silicon dioxide in contact with said substrate and said second dielectric is silicon nitride in contact with said first dielectric layer and said gate electrode means.

4. The memory device of claim 1 further including a fixed threshold means disposed between a second portion of said gate electrode means, said fixed threshold means being intermediate said variable threshold means and said region of opposite conductivity type, said fixed threshold means capable of establishing a surface inversion layer in said substrate when said read potential pulse is applied, the electric field produced in said substrate under said fixed threshold means being of less magnitude than the field produced under said variable threshold means, the combined electrical fields of said fixed and variable threshold means cooperating to prevent minority carriers removed from said single region of opposite conductivity type from returning to said region of opposite conductivity type and causing said carriers to be dissipated into said substrate when said control potential is removed to provide a reverse bias potential on said region of opposite conductivity type.

5. The memory device of claim 4 wherein said read means provides a plurality of read potential pulses providing an increase in the reverse bias potential on said region of opposite conductivity type with each successive pulse when said inversion layer has been established.

6. A variable threshold memory device comprising a semiconductor substrate of one conductivity type, said substrate containing in a first portion thereof only a single region of opposite conductivity type extending from one surface thereof into said substrate;

variable threshold means capable of selectively providing a high and low threshold condition to a second portion of the surface of said semiconductor substrate adjacent to said first portion, said high and low threshold conditions representative of first and second logic states, respectively;

means for conditioning said variable threshold means to assume one of said threshold conditions;

read means for applying a read potential across said variable threshold means establishing an inversion layer in said second portion of the surface of said semiconductor substrate connected with said single region of opposite conductivity type only when said variable threshold means is in said low threshold condition;

a source of predetermined potential;

means for selectively coupling said source of predetermined potential to said region of opposite conductivity type;

means for electrically isolating said region of opposite conductivity type from said source of predetermined potential and placing said region at a floating potential at least when said read potential is applied across said variable threshold means; and means coupled to said region of opposite conductivity type to sense the magnitude of capacitive coupling across said variable threshold means when said read potential is applied across said variable threshold means to determine the logic state corresponding to the threshold condition assumed by said variable threshold means, the presence of said inversion layer corresponding to said second logic state.

7. The memory device of claim 6 wherein said substrate comprises silicon and said variable threshold means comprises a thin tunneling dielectric layer contacting said semiconductor surface, a trapping dielectric layer contacting said tunneling dielectric layer and a conductive layer contacting said trapping dielectric layer.

8. The memory device of claim 7 wherein said tunneling layer is silicon dioxide.

9. The memory device of claim 8 wherein said tunneling layer is silicon dioxide having a thickness of about 30 Angstrom units and said trapping layer is silicon nitride having a thickness of about 500 Angstrom units.

10. The memory device of claim 6 wherein there is provided means to reset the potential of said single region of opposite conductivity type to said predetermined reference potential prior to applying said read potential.

11. An integrated circuit variable threshold memory array comprising:

a semiconductor substrate of one conductivity type;

a plurality of substantially parallel elongated regions of opposite conductivity type extending from one surface of said substrate into said substrate;

a plurality of variable threshold dielectric regions adjacent to and associated with each region of opposite conductivity type, each variable threshold dielectric region being associated with only one region of opposite conductivity type;

a plurality of conductive gate members extending orthogonally to said regions of opposite conductivity type, each of said gate members being in field applying relation to only one variable threshold dielectric region of each region of opposite conductivity type;

write means for selectively applying potentials in excess of a critical magnitude between at least one selected gate member and said substrate, a potential of a first polarity conditioning a variable threshold gate dielectric region in a first threshold state representative of a first logic state and a potential of opposite polarity conditioning a variable threshold gate dielectric region in a second threshold state representing a second logic state;

read means comprising:

means for establishing a floating reference potential on at least one of said regions of opposite conductivity type;

means for selectively coupling a read potential pulse between at least one of said gate members and said substrate for establishing a surface inversion layer in the surface of said substrate beneath said variable threshold gate dielectric region associated with said selected one of said gate members, said inversion layer being connected to only one region of opposite conductivity type, said inversion layer being formed only when said gate dielectric region has been conditioned in the one of said first and second threshold states corresponding to a lower magnitude threshold; and potential sensing means coupled to said regions of opposite conductivity type for sensing the capacitive coupling effect said inversion layer has on said floating reference potential in the presence of said read potential pulse; and output means responsive to said potential sensing means for providing an output signal representative of one of said first and second logic states.

12. The memory array of claim 11 wherein said semiconductor substrate is silicon and said variable threshold dielectric regions comprise a thin layer of silicon dioxide in contact with said substrate surface and a layer of silicon nitride in contact with said silicon dioxide layer.

* * * * *